United States Patent [19]

Massarsch

[11] Patent Number: 4,647,258
[45] Date of Patent: Mar. 3, 1987

[54] ARRANGEMENT IN VIBRATION ISOLATION OR VIBRATION DAMPING

[76] Inventor: Karl R. Massarsch, Ängsullsvägen 208, Vällingby, Sweden, S-162 46

[21] Appl. No.: 722,714

[22] Filed: Apr. 11, 1985

[30] Foreign Application Priority Data

Oct. 19, 1984 [SE] Sweden .................. 8405248

[51] Int. Cl.$^4$ ............................................. E02D 31/08
[52] U.S. Cl. ........................................ 405/258; 52/167
[58] Field of Search .................. 405/19, 25, 26, 27, 405/63, 68, 69, 258; 52/167

[56] References Cited

U.S. PATENT DOCUMENTS

| 3,237,414 | 3/1966 | Straub et al. | 405/26 |
| 3,696,623 | 10/1972 | Heine | 405/19 |
| 3,925,993 | 12/1975 | Roth | 405/258 |
| 4,266,379 | 5/1981 | Aguilar | 52/167 X |
| 4,320,991 | 3/1982 | Rogers | 405/68 |

FOREIGN PATENT DOCUMENTS 430620 10/1983 Sweden .
436774 11/1983 Sweden .

Primary Examiner—David H. Corbin

[57] ABSTRACT

The present invention relates to an arrangement in vibration isolation or vibration damping of vibrations generated in a medium, said arrangement including one or more separate or connectable diaphragms (1) immersible in the medium. In accordance with the invention the diaphragm (1) comprises at least two layers, an outer (2) and inner (3) diaphragm casing. One of the inner diaphragm casings has cells or ducts. An outer support layer (not shown) may constitute an integrated part of the outer diaphragm casing (2) or form a further support pad arranged outside the outer diaphragm casing. The diaphragm also has heat-insulating and pressure-reducing properties.

19 Claims, 5 Drawing Figures

U.S. Patent        Mar. 3, 1987        4,647,258
Fig. 1
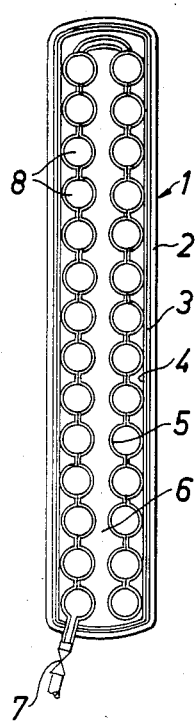
Fig. 2
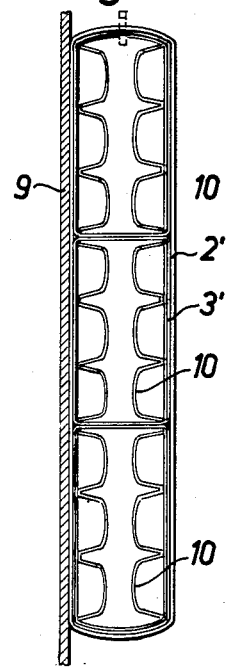
Fig. 3
Fig. 4
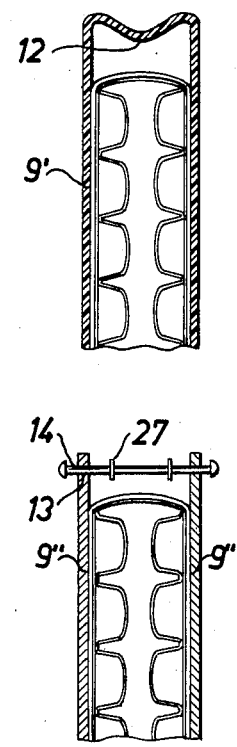
Fig. 5
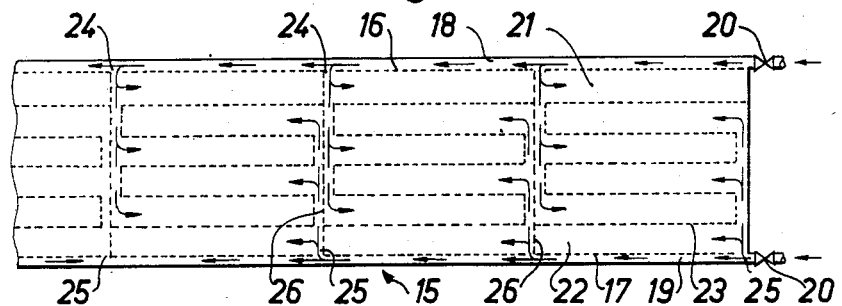

ARRANGEMENT IN VIBRATION ISOLATION OR VIBRATION DAMPING

The present invention relates to an arrangement in vibration isolation or vibration damping of vibrations generated in soil and water.

It is generally known that vibrations generated in a medium, e.g. soil or water, and which propagate themselves in the medium, may cause damage to installations both on and in the medium in question. Vibrations, the progagations of which it is desirable to prevent may come from a number of different sources. Apart from natural, undesirable movements in ground strata, e.g. earth quakes, different kinds of machines, construction activities or vehicles can also generate such severe vibrations that the propagation of these in the earth strata causes damage to adjacent buildings, machines or apparatus. It is also desirable during blasting to isolate the effects of the blast to a very limited area. Many attempts have been made to prevent the spread of vibrations, so-called vibration isolation.

The vibration-damping properties of the air have been utilized in some cases in the methods which have come into use. In cases where soil is the medium, gas-filled single-layer diaphragms may be taken down vertically into the soil. In its simplest implementation the diaphragm consists of an airfilled container of a suitable plastics material. One or more such containers can be connected together to form a longer continuous diaphragm element. This arrangement is described exhaustively in the Swedish Pat. No. 8202478-7 (publication number 430.620).

Since the pressure in soil or water normally varies with depth, the air will migrate towards the portion of the container where the confining pressure is lowest. The thickness of the container can thus decrease under unfavourable conditions, so that its vibration-damping properties cease.

The disadvantage with this implementation is that air has the possibility of diffusing out of the diaphragm with deteriorated vibration-damping properties as a result. Furthermore, there exists the risk during installation and thereafter that one or more containers are punctured, the isolation properties of the diaphragm then ceasing entirely. The stiffness and strength is also low, since the isolation must be carried out with thin diaphragms.

A method of isolation structures on piled foundations from vibrations in the soil has been described in the Swedish patent application 8203047-9 with the publication number 436.774, where piles are equipped with a protective tube which provides a slot between the pile and the surrounding soil.

In another embodiment described in U.S. Pat. No. 4,396,312, the vibration-damping properties of the air are utilized in high-ways by arranging open air ducts in the outer surface of the road paving. A disadvantage with this method is that only vibrations on the surface are dampened.

If, on the other hand, the medium is water, the problem of propagation and spreading of the vibrations has been solved in such as sub-marine blasting by the arrangement of bubble curtains. With the aid of submerged, holed air hoses an air curtain is arranged between the blasing location and the structure or structures which are to be protected. This method is temporary and difficult to control.

The present invention has the object of increasing the compressibility and damping properties of soil, water or other fill materials. The invention may be utilized for solving different dynamic or static problems, e.g. those occurring in conjunction with vibrations both in shallow and deep earth strata and in water down to a considerable depth. The arrangement for vibration isolation in accordance with the invention thus comprises in its simplest implementation of a flexible diaphragm built up from at least two layers, of which one is formed with cells or ducts filled with a suitable medium. The vibration-isolating properties of the diaphragm are increased considerably by this implementation, while the risk of puncturing the diaphragm is minimized at the same time. Further advantages of the invention will be apparent from the following.

In another application the multi-layer diaphragm is implemented as flexible cushions which are placed in natural earth strata or fill materials or against structures in soil. The compressibility of these materials is thus increased for static or dynamic loading. For earth quakes the increased compressibility means that the risk of "liquifaction" decreases in loose, water-saturated friction soils.

The invention may be used to solve both active and passive vibration problems. In active vibration problems the multilayer membrane is arranged close to the vibration source, so as to change its dynamic properties. In passive vibration problems the main object is to screen off structures from a vibration source situated at a distance therefrom.

Static deformation problems may also be solved with the aid of the multi-layer diaphragm. As examples may be mentioned stress changes towards structures in soil (sheet piling, conduits, house walls etc.) due to frost, piledriving, infiltration of water into soil etc.

The distinguishing features of the invention will be seen from the following claims.

The invention will now be described in detail with reference to the accompanying drawings, on which FIG. 1 is a cross section of a multi-layer diaphragm, FIG. 2 is a cross section of a multi-layer diaphragm according to an alternative embodiment, FIG. 3 illustrates in enlarged scale one end of the multi-layer diaphragm with one casing formed as a support layer provided with a bellows, FIG. 4 illustrates an alternative embodiment of both support layers, and FIG. 5 illustrates an alternative embodiment of an inner diaphragm casing in an unfolded flat state.

In a simple embodiment, see FIG. 1, the invention is implemented as a multi-layer diaphragm 1, which comprises an outer diaphragm casing 2 and an inner diaphragm casing 3 in the form of a sheet. The outer casing 2 (the protective casing) is made as a closed container from a strong, air tight flexible material, e.g. plastics. The thickness of the casing 2 may therefore be greater than the thickness of the casing 3. Inside the outer casing 2 the inner casing 3 (diffusion seal) is arranged to prevent air diffusing out to the casing 2. The casing 3 has a backing casing 4 consisting of diffusion-resistant sheet (plastics, metal, etc.). On the inside there is arranged a flexible sheet 5 comprising closed cells 8 according to FIG. 1, or open ducts according to FIG. 5. The cells 8 may either be cohesive or separated from each other. The space 6 or the cells 8 may be filled with air, gas, liquid or foam. In certain cases it may be suitable directly to join the sheets 2,3 and/or 5 to each other, e.g. by welding or gluing. In FIG. 1 the spaces between the different layers have been exaggerated somewhat so that the different layers and spaces will be perceived with desirable clarity. A valve 7, may be assigned to the inner diaphragm casing 3 and/or the cells 8 to fill the space 6 or 8 with a suitable compressible medium and to the desired pressure. The pressure may be different in the space 6, cells 8 and/or the space between the sheets 2 and 3, and is adjusted to suit the problem in hand. The pressure in the cells 8 is customarily higher than the pressure in any of the other spaces. To increase the mobility and flexibility of the multilayer diaphragm it is suitable that the inner casing 3 is freely arranged in, but in close association to, the outer casing 2. The multi-layer diaphragm in accordance with the invention can have a thickness of one or some centimeters. In spite of the relatively thin diaphragm, vibrations occurring are isolated effectively due to the air-filled, flexible cells. The risk of puncturing the multi-layer diaphragm is very small. Damage to one or a few cells does not reduce the vibration-damping properties of the diaphragm. The cells 8 remain even though the medium in the space 6 disappears or if it has been consciously excluded.

The risk of a gas in the space diffusing out through the multi-layer diaphragm is small due to the diffusion-sealing sheet 3 and the outer diaphragm casing 2. The protective casing 2 shall be sufficiently strong so that the pressure from the earth strata, which is usually nonuniform, is taken up and distributed by it together with the medium in the space 6. The diaphragm element according to FIG. 1 can be coupled together in different ways to larger cohesive panels, of FIGS. 2 and 5.

A multi-layer diaphragm is illustrated in FIG. 2, and has an outer diaphragm casing 2' and in inner diaphragm casing 3', similar to casings described in connection with FIG. 1. A support layer 9 is attached to the outer diaphragm casing 2'. An advantage of the support layer is that it further evens out large concentrated loads on the multi-layer diaphragm. Another advantage is that the diaphragm can be easily attached to structures, e.g. building walls. If a multi-layer diaphragm is to be raised in the soil in conjunction with refilling after excavation, the diaphragm is provided with one or two support layers 9 for facilitating refilling. Without this support layer, great demands are made on the nature of the fill material, so that it will not damage the diaphragm. It is also suitable to provide multi-layer diaphragm in sub-marine installations with an outer support layer to even out pressure differences in the water. As will be further seen from FIG. 2, the inner diaphragm casing 3' may be divided into subcasings 10. Each sub-casing may have an interior pressure differing from the remaining sub-casings. This is suitable when the diaphragm is used in soil or water down to large depths where the pressure is large compared with the pressure at the surface. In this way the compression of the diaphragm may be kept constant over its entire length. The risk of puncturing the entire inner casing 3 is decreased at the same time.

The stiffness of the multi-layer diaphragm increases in the cases where two support layers 9 are used, one on either side of the diaphragm. It is also possible to arrange a cohesive support layer 9' round the entire periphery of the multi-layer diaphragm. Its thickness can be increased in certain cases to increase the volume compressibility in the medium which is to be dampened. In this case the short sides of the diaphragm are suitably formed as bellows 12, which will be seen in FIG. 3, to increase the flexibility of the diaphragm and its ability to take up forces. In this case the support layer may replace the outer casing 2 or 2'.

An alternative embodiment of the arrangement according to FIG. 3 is illustrated in FIG. 4. Here both support layers 9' are immovably coupled to each other with the aid of common guide means 14 comprising flexible couplings via holes 13 in the layers 9. The guide means may be provided with abutments 27 restricting the maximum amount of compression of the membrane and thereby protecting it from overloading.

In certain cases it may be desirable to vary the pressure in the multi-layer diaphragm after installing it. This can be achieved in different ways.

As previously mentioned, the inner casing 3,3' may be formed with ducts instead of cells. Such a diaphragm casing 15 is illustrated in FIG. 5 in a flat condition. Two sheets one on top of the other are preferably welded together along their outer edges. In the vicinity of the longitudinal outer edges of the casing inlet ducts 18,19 are formed with the aid of multitudinal weld seams 16,17, the ducts being provided with valve means 20 at one end of the casing. At the other end of the casing the ducts are closed off with the aid of transverse weld seams. Between the longitudinal inlet ducts the casing is provided with two mutually spaced main ducts 21,22 which are formed by a zig-zag weld seam 23. The main duct 21 is in communication with the inlet duct 18 via the opening 24, and the main duct 22 is in communication with the inlet duct 19 via the opening 25. As will be seen from FIG. 5, the diaphragm casing 15 may be divided into sub-casings by transverse weld seams 26. A plurality of openings 24,25 are thus formed in the inlet ducts 18 and 19. The different duct systems can also be manufactured and located separate from each other, e.g. in the form of a hose system.

Both main ducts can be filled with air, gas, liquid or foam in a similar way as with the previously mentioned cells. An advantage with the ducts according to the invention is that the same media at different pressures or different media can be used simultaneously. After filling a sub-casing it is also possible to extend the transverse weld 26 by welding to delimit this sub-casing from another or other sub-casings, thus enabling different pressures to be generated in the different sub-casings.

The diaphragm casing in accordance with the invention can also be used in an arrangement where tubes are coaxially arranged around piles between which there is an air gap (slot). A flat diaphragm casing arranged in the slot can be filled with a suitable medium so that the casing expands and fills the gap. Coaxially arranged piles of this kind are described in detail in the Swedish patent application No. 8203047-9. In a similar way, flat multi-layer diaphragms can be arranged against support structures (sheet piling, slotted walls etc.) in earth, fill material, water or snow.

From what has been set forth above will be perceived that the multi-layer diaphragm in accordance with the invention may be used within widely different fields for vibration isolation or compression increase of earth or fill material. With the aid of a diaphragm comprising several layers the risk of diffusion through, and puncturing of the diaphragm walls, is reduced. The cells or ducts of the inner casing increse the vibrationisolating properties of the multi-layer diaphragm.

The diaphragm also has favourable heat-insulation properties and can reduce static loads against basement walls or other structures.

The embodiment illustrated in the Figures of a multi-layer diaphragm for vibration-isolation may, of course, be modified without departing from the inventive concept. The invention shall thus not be considered restricted to the embodiment discussed hereinbefore, but may be well within the scope of the following claims.

I claim:

1. Arrangement for heat energy and/or vibration insulation and including a diaphragm immersed in a medium selected from the group comprising earth and water, said diaphragm comprising a flexible outer diaphragm casing comprising a container impervious to earth and water and at least one flexible inner diaphragm casing defining a sealed container of a material impervious to diffusion, said inner diaphragm casing containing means filled with a compressible substance to impart to said means within said inner casing shock-absorbing properties.

2. Arrangement as in claim 1, wherein the diaphragm is thicker than said inner diaphragm and constitutes mechanical protection for the inner casing.

3. Arrangement as claimed in claim 1, wherein said means within said inner casing consists of closed cells or ducts with shock absorbing properties, which are filled with air, gas, liquid or foam or combinations thereof.

4. Arrangement as in claim 3, wherein the cells or ducts are so arranged that one or more spaces are formed between them and the inner diaphragm casing, said one or more spaces being filled with either air, gas, liquid or foam.

5. Arrangement as claimed in claim 3, wherein the ducts in the inner diaphragm casing are formed in two sheets welded to each other along their outer edges, orifices being provided opening out into inlet ducts which are arranged parallel to longitudinal sides of the inner diaphragm casing and which communicate with main ducts arranged in the casing.

6. Arrangement as claimed in claim 5, wherein a first inlet duct at one side of the casing communicates via one or more first duct openings with one or more first main ducts and that a second inlet duct at the opposite side of the casing communicates with one or more second main ducts via one or more second duct openings.

7. Arrangement as claimed in claim 6, wherein the first main duct or ducts is/are separated from the second main duct or ducts with the aid of cohesive longitudinal and transverse seams.

8. Arrangement as claimed in claim 7, characterized in that the first and the second main ducts are formed as cohesive fork-shaped projections, and the longitudinal and transverse seams arranged such that the fork-shaped projections of the first main duct cover the space between the fork-shaped projections of the second main duct, whereby contiguous seams of adjacent fork-shaped projections are common.

9. Arrangement as claimed in claim 2 wherein the inner diaphragm casing is divided into sub-casings which may be sealed off from each other.

10. Arrangement as claimed in claim 2 wherein at least one support layer is arranged outside the outer diaphragm casing.

11. Arrangement as claimed in claim 10, wherein the outer diaphragm casing is provided with two support layers at each of the long sides of the diaphragm casing.

12. Arrangement as claimed in claim 11, wherein the support layers are connected to each other by one or more flexible couplings.

13. Arrangement as claimed in claim 12, wherein the flexible coupling or couplings are provided with abutments.

14. Arrangement as claimed in claim 2 wherein the outer diaphragm constitutes a support layer.

15. Arrangement as claimed in claim 13, wherein the support layer includes one or more flexible couplings.

16. Arrangement as claimed in claim 12 wherein the flexible coupling is a bellows.

17. Arrangement as claimed in claim 2 wherein said diaphragm casings have one or more valve means whereby the cells, ducts, spaces and sub-casings may be provided with pressures which are either the same or mutually differing.

18. Arrangement according to claim 1, wherein it is used for vibration dampening.

19. Arrangement as claimed in claim 1, wherein the inner diaphragm casing includes a backing casing in the form of a diffusion resisted sheet.

* * * * *